(12) United States Patent  (10) Patent No.: US 8,210,027 B2
Goel  (45) Date of Patent: Jul. 3, 2012

(54) RESONATOR DEVICE FOR DETECTING HELIUM

(75) Inventor: Atul Goel, Fort Collins, CO (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 542 days.

(21) Appl. No.: 12/510,433

(22) Filed: Jul. 28, 2009

(65) Prior Publication Data

US 2011/0023607 A1   Feb. 3, 2011

(51) Int. Cl.
  *G01N 29/02* (2006.01)
(52) U.S. Cl. .................................................. 73/24.06
(58) Field of Classification Search .............. 73/24.01, 73/24.06
  See application file for complete search history.

(56) References Cited

U.S. PATENT DOCUMENTS

| | | | |
|---|---|---|---|
| 6,029,500 A * | 2/2000 | Tom | 73/31.05 |
| 2005/0183492 A1 * | 8/2005 | Rao et al. | 73/24.06 |
| 2007/0138909 A1 * | 6/2007 | Mortet et al. | 310/318 |
| 2008/0134751 A1 | 6/2008 | Huang | |

FOREIGN PATENT DOCUMENTS

EP   1 813 928 A2   8/2007

OTHER PUBLICATIONS

Related U.S. Appl. No. 12/430,966, Joel Philliber et al., "Microcap Acoustic Transducer Device".
Ahuja et al., "A Micromachined Surface Acoustic Wave Sensor for Detecting Inert Gases", Ultrasonics Symposium, 1996. Proceedings IEEE, vol. 1, Nov. 3-6, 1996 pp. 435-438.
Gizicki et al., "Ultrasonic Helium Detectors Applied in Oxygen Deficiency Hazard Monitor System in Radiation Environment", Measurement Science and Technology, Jul. 6, 2007, vol. 18, pp. 2418-2423.
Anil K. Desingh, "MEMS Technology in Analytical Chemistry", The Analyst, Jan. 2003, pp. 9-11.

* cited by examiner

*Primary Examiner* — Hezron E Williams
*Assistant Examiner* — Nathaniel Kolb

(57) ABSTRACT

A device for detecting helium in ambient atmosphere includes a resonator and a frequency detector. The resonator includes a piezoelectric film layer configured to absorb helium atoms. The frequency detector configured to detect a change in resonant frequency of the resonator when helium is absorbed into the piezoelectric film layer from the ambient atmosphere.

19 Claims, 3 Drawing Sheets

RESONATOR DEVICE FOR DETECTING HELIUM

BACKGROUND

Helium is a mono-atomic inert gas, and the smallest known gas molecule, and thus can pass through the smallest of openings. Therefore, helium is useful in leak detection. For example, helium gas may used to test the integrity of a vessel, such as an airtight or watertight container, by injecting the helium gas into the vessel and monitoring an outer surface of the vessel for the presence of helium atoms. Helium gas may likewise be used to test the integrity of other containers or conduits, such as gas pipelines, plumbing, fuel lines and the like.

Because of helium's chemical inertness, detection of helium is typically performed through identification of physical properties. For example, a mass spectrograph is able to identify the presence of helium by ionizing the helium atoms and then subjecting the resulting ions to magnetic and electric fields. This determines the relative mass of the helium ions and, through calibration against an alternate known gas, determines the presence of helium. However, detection of helium using a mass spectrograph or other ionization or infrared spectral tool, requires large and expensive equipment, and typically consumes large amounts of power.

SUMMARY

In a representative embodiment, a device for detecting helium in ambient atmosphere includes a resonator and a frequency detector. The resonator includes a piezoelectric film layer configured to absorb helium atoms. The frequency detector configured to detect a change in resonant frequency of the resonator when helium is absorbed into the piezoelectric film layer from the ambient atmosphere.

In another representative embodiment, a device for detecting helium in ambient atmosphere includes a substrate, a resonator and a frequency detector. The resonator is formed on the substrate, and includes an aluminum nitride thin film layer between an upper electrode and a lower electrode, a first portion of the aluminum nitride thin film layer being exposed to the ambient atmosphere through a first opening defined by the upper electrode. A crystal lattice structure of the aluminum nitride thin film layer is arranged to capture helium atoms from the ambient atmosphere that come into contact with the exposed first portion of the aluminum nitride thin film layer. The frequency detector is configured to detect a change in resonant frequency of the resonator when the helium atoms are captured in the crystal lattice structure of the aluminum nitride thin film layer.

In another representative embodiment, a system for detecting helium in ambient atmosphere includes an array of resonators, a frequency detector and a controller. Each resonator includes an aluminum nitride thin film layer between an upper electrode and a lower electrode, a first portion of the aluminum nitride thin film layer being exposed to the ambient atmosphere through a first opening defined by the upper electrode. A crystal lattice structure of the aluminum nitride thin film layer is arranged to capture helium atoms from the ambient atmosphere that come into contact with the exposed first portion of the aluminum nitride thin film layer. The frequency detector is configured to detect a change in a resonant frequency of at least one resonator of the array of resonators when the helium atoms are captured in the crystal lattice structure of the corresponding aluminum nitride thin film layer of the at least one resonator. The controller is configured to determine a location of the helium atoms by identifying the at least one resonator having the change in the resonant frequency.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
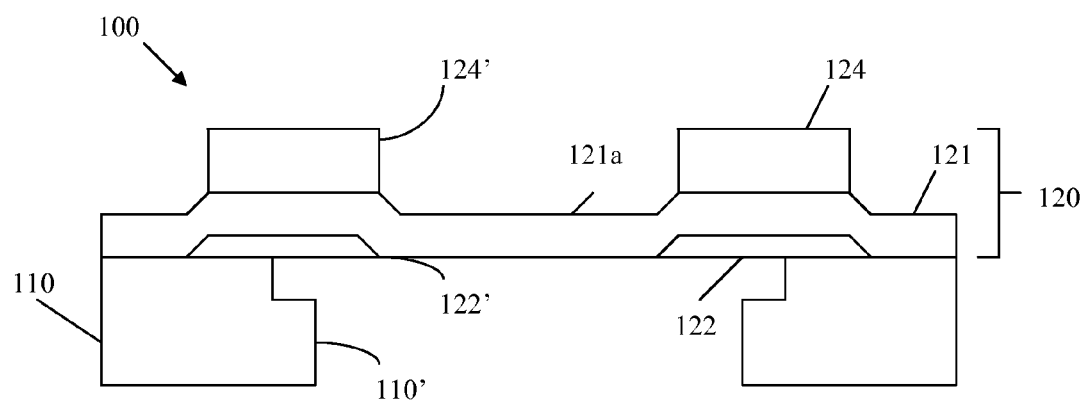
FIG. 1A is a cross-sectional diagram illustrating a cross-section of a resonator device, according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Generally, it is understood that the drawings and the various elements depicted therein are not drawn to scale. Further, relative terms, such as "above," "below," "top," "bottom," "upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

According to various embodiments, a resonator device includes a transducer stack having a piezoelectric thin film layer of Aluminum Nitride (AlN), at least a portion of which is exposed to the ambient atmosphere. In the presence of helium, the AlN thin film captures or absorbs the helium atoms, which alters the resonant frequency and other physical properties of the AlN thin film, thus changing the frequency response of the resonator device, indicating the presence of helium atoms. In various embodiments, the resonator device may include an acoustic resonator that resonates at various frequencies and in various modes including the human audio range and ultrasonic, and diaphragm flexure or film bulk modes. Also, the acoustic resonator may be configured as a micro-electro-mechanical system (MEMS) device.

Figure 1B:
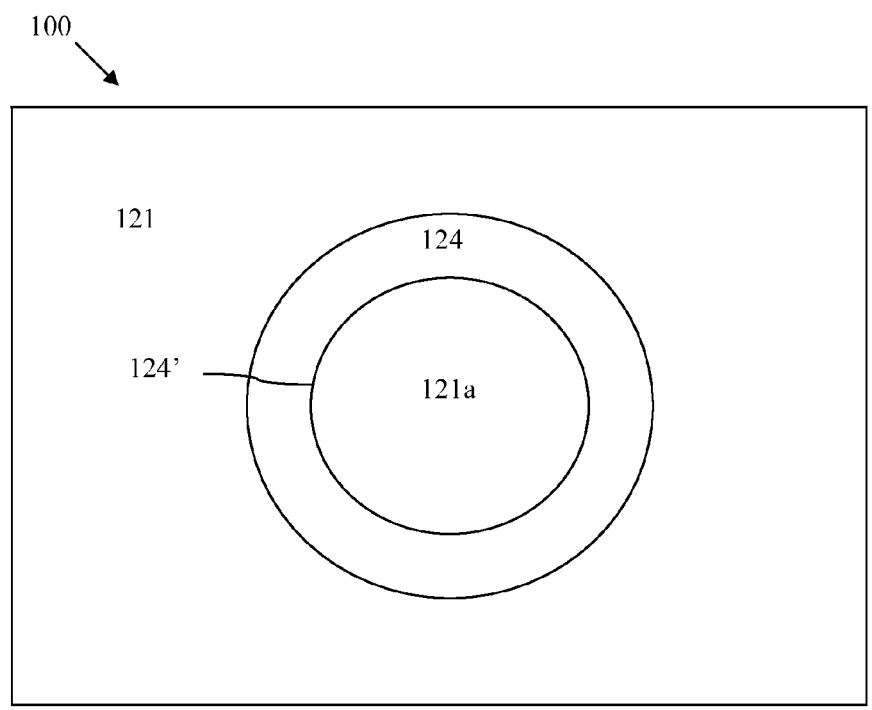
FIG. 1B is a top plan view illustrating a surface view of the resonator device, according to a representative embodiment.

FIG. 1A is a cross-sectional diagram illustrating a cross-section of helium detecting resonator device, according to a representative embodiment. FIG. 1B is a plan view of the resonator device of FIG. 1A, showing the upper surface, according to a representative embodiment.

Referring to FIG. 1A, resonator device 100 includes resonator 120, for example, having a layered structure including lower electrode 122, resonating material or piezoelectric layer 121 and upper electrode 124, formed on substrate 110. In an embodiment, the resonator 120 is an acoustic resonator, fabricated using MEMS technology, for example, although other types of resonators may be incorporated without departing from the scope of the present teachings. The piezoelectric layer 121 is a thin film of AlN material. Other thin films having properties similar to those of AlN film, e.g., with respect to crystal structure discussed below, and compatible with semiconductor processes may be used alternatively. The substrate 110 may be various types of materials, including an insulating material, such as glass, sapphire, alumina, or the like, or any semiconductor material, such as silicon, gallium arsenide (GaAs), indium phosphide (InP), or the like. A semiconductor substrate is useful for integrating electronics into one (MEMS) chip. For example, when the substrate 110 is a semiconductor substrate, a full integrated circuit may be created that duplicates some or all of the electronic functions of a signal generator, frequency detector, etc. (discussed below with reference to FIG. 4), thus reducing size and cost.

The substrate 110 defines 1 substrate opening 110', which is may be formed, for example, by machining or by chemically etching the substrate 110 using photolithography, although various alternative techniques may be incorporated. In various embodiments, either one or both of the upper and lower surfaces of the piezoelectric layer 121 may be exposed to the ambient environment for purposes of detecting helium. More particularly, a suspended portion 121a of the piezoelectric layer 121 is defined by annular lower electrode 122 on the bottom surface and by annular upper electrode 124 on the top surface of the piezoelectric layer 221. A bottom surface of the suspended portion 121a is exposed to the ambient through opening 122' defined by the lower electrode 122 (as well as substrate opening 110' defined by the substrate 110), and/or a top surface of the suspended portion 121a is exposed to the ambient through opening 124' defined by the upper electrode 124. The suspended portion 121a is therefore able to come into physical contact with helium atoms from the underside and/or the top side when present in the ambient environment. This approach increases the exposed surface of the AlN film 121a to the ambient, thus increasing the device's sensitivity. In an embodiment, the piezoelectric layer 121 may be about 0.2 micron to about 10 micron thick at the suspended portion 121a, for example.

As stated above, the piezoelectric layer 121 is positioned between lower electrode 122 and upper electrode 124, creating stacked transducers which convert electrical input signals into mechanical vibrations and the mechanical vibrations into electrical output signals. In the depicted embodiment, the lower and upper electrodes 122 and 124 are substantially circular rings which surround the suspended portion 121a of the piezoelectric layer 121. In alternative embodiments, one of the electrodes 122 or 124 may not include an opening and/or one or both may have different shapes. The electrical input signal (e.g., excitation signal), having a predetermined input frequency, may be input at the lower electrode 122 (or upper electrode 124) and converted to a mechanical vibration (or resonance) having a frequency induced by the electrical input signal at the piezoelectric layer 121. The electrical output frequency depends on a function or frequency response of the resonator 120 based on the input frequency. In an embodiment, the electrical input signal is selected to coincide with the resonant frequency of the resonator 120, such that the electrical output signal substantially coincides with the electrical input signal.

FIG. 1B shows a view from above the upper surface of the resonator device 100. The upper electrode 124 surrounds the exposed upper surface of the suspended portion 121a through the upper opening 124'. It is understood that, in other embodiments, the arrangement and shapes of the lower and upper electrodes 122 and 124 may vary to provide unique benefits for any particular situation or to meet application specific design requirements of various implementations, as would be apparent to one skilled in the art. For example, the lower and upper electrodes 122 and 124 may be ovals or other shapes, or may not be fully enclosed.

The lower and upper electrodes 122 and 124 are formed of an electrically conductive material, such as molybdenum, tungsten or aluminum, or the like. In an embodiment, the lower electrode 122 may be formed by applying a conductive layer to an upper surface of the substrate 110, prior to formation of the substrate opening 110'. The conductive layer may be patterned, for example, using photolithography, although various alternative techniques may be incorporated, to provide the shape of the lower electrode 122. The piezoelectric layer 121 may then be formed on the patterned lower electrode 122, followed by application of another conductive layer, for example, to the upper surface of piezoelectric layer 121, which is patterned to provide the shape of the upper electrode 124. The substrate opening 110' may be formed following formation of the piezoelectric layer 121, as discussed above.

Figure 2:
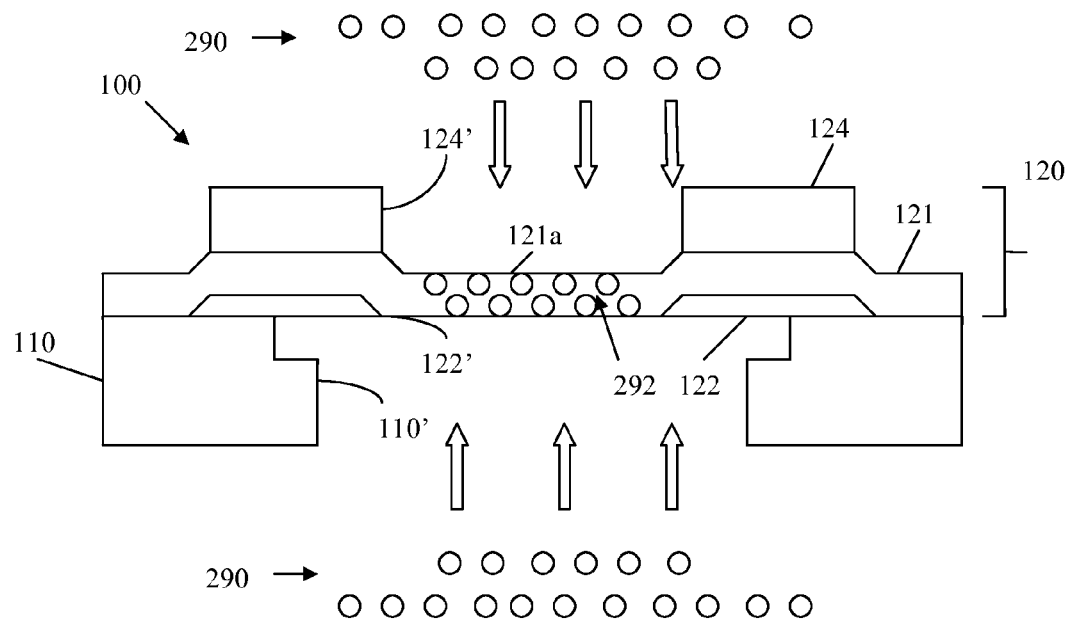
FIG. 2 is a cross-sectional diagram illustrating a cross-section of a resonator device in the presence of helium atoms, according to a representative embodiment.

FIG. 2 is a cross-sectional diagram illustrating a cross-section of helium detecting resonator device, as shown in FIGS. 1A and 1B, in the presence of helium gas, according to a representative embodiment.

As stated above, an electrical input signal having a predetermined input frequency is applied to the resonator 120 (e.g., lower electrode 122), causing the piezoelectric layer 121 to vibrate at the resonant frequency. The resonant frequency, as well as other physical properties of the resonator device 100, is dependant on mass density, net mass, and other properties of the piezoelectric layer 121.

Because a helium molecule consists of a single helium atom, it has a small molecular size relative to other gases. Therefore, as shown in FIG. 2, when helium atoms 290 are present in the ambient environment, they are able to penetrate a crystal lattice of the AlN film of the piezoelectric layer 121, e.g., via the lower opening 122' and/or the upper opening 124', as shown by captured helium atoms 292. That is, when the AlN film of the suspended portion 121a is exposed to the ambient environment, the captured helium atoms 292 occupy open interstitial spaces between aluminum and/or nitrogen atoms in the crystal lattice. The piezoelectric layer 121 is formed so that interstitial spaces within the crystal lattice of the AlN film open toward the surface of the piezoelectric layer 121. For example, in an embodiment, a structure of the crystal lattice is arranged so that the interstitial spaces are aligned substantially open to the surface of the piezoelectric layer 121 at the suspended portion 121a.

Absorption of the helium atoms 292 into the piezoelectric layer 121 increases the mass density and thus the net mass of the AlN film, which alters the resonant frequency of the resonator 120. For example, increased net mass density of the AlN film changes the resonant frequency of the resonator 120. This change in resonant frequency may be detected by various means, discussed in detail with respect to FIG. 4. For example, if a spectrum analyzer were used to monitor the electrical output signal from the resonator 120, an amplitude peak would be displayed indicating the resonant frequency. When the resonant frequency changes (e.g., decreases) due to absorption of helium atoms 292, the signal peak would shift to a corresponding lower frequency. Alternatively, a less sophisticated detector may be used to simply detect a drop in amplitude of the signal corresponding to the initial resonant frequency, which indicates that resonant frequency has changed, and thus absorption of helium atoms.

The helium atoms 292 may modify other physical properties of the AlN film, which may also alter measurable performance of the resonator 120, in various embodiments, and thus be used for detection of helium.

In operation, the resonant frequency of the resonator 120 shifts by a detectable amount when the helium atoms 292 are absorbed by the piezoelectric layer 121. The resonant frequency then shifts back to the initial resonant frequency when the helium 290, 292 is removed from the ambient environment, and thus dissipated from piezoelectric layer 121. The presence of other gases in the ambient environment has no equivalent effect, due to the larger molecular sizes of these gases, which are unable to enter into the interstitial spaces within the AlN film of the piezoelectric layer 121.

Figure 3:
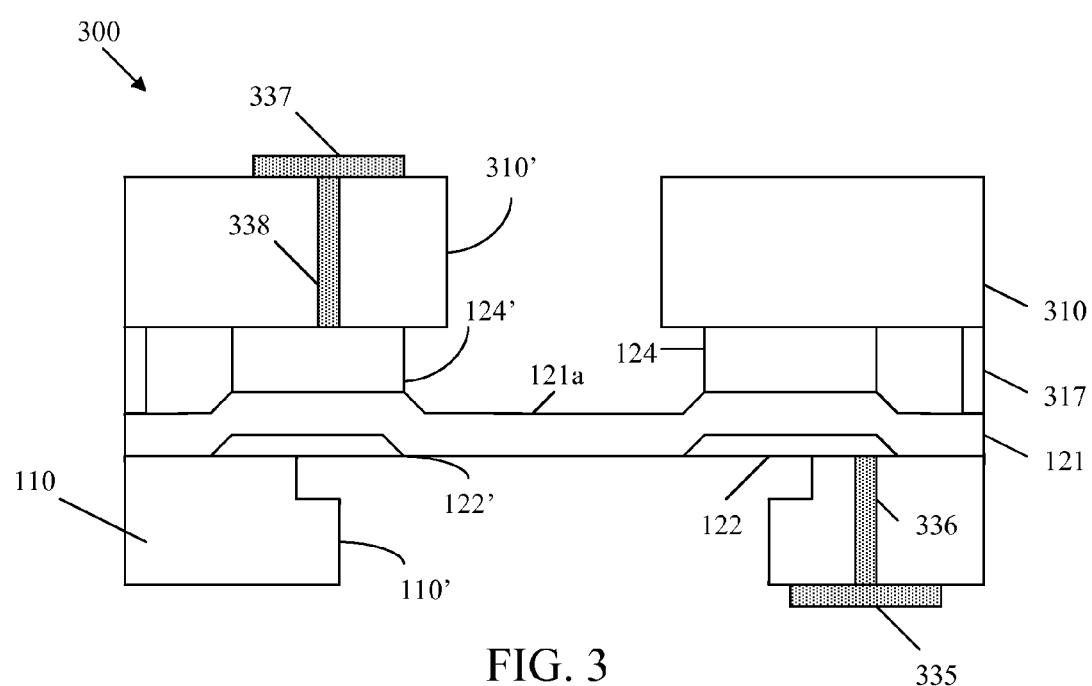
FIG. 3 is a cross-sectional diagram illustrating a cross-section of an encapsulated resonator device, according to a representative embodiment.

FIG. 3 is a cross-sectional diagram illustrating a cross-section of an encapsulated resonator device, according to a representative embodiment.

Referring to FIG. 3, the resonator device 100 is shown packaged as encapsulated resonator device 300. The encapsulated resonator device includes cap 310 (e.g., a microcap), which may be formed of the same material as the substrate 110, for example. The cap 310 defines cap opening 310', which may be formed, for example, by machining or by chemically etching the cap 310 using photolithography, although various alternative techniques may be incorporated. The cap opening 310' exposes a portion of the upper surface of the suspended portion 121a of the piezoelectric layer 121 to the ambient environment, via the upper opening 124', in substantially the same manner as discussed above with respect to the substrate opening 110', via the lower opening 122'. Thus, the suspended portion 121a may be exposed to and detect helium gas coming into contact with one or both of its upper and lower surfaces, as discussed above. Encapsulation referred to as a microcap is described in detail, for example, in U.S. patent application Ser. No. 12/430,966, filed Apr. 28, 2009, the subject matter of which is hereby incorporated by reference. However, various embodiments may include any type of conventional chip packaging.

The space between the bottom surface of the cap 310 and the upper surface of the semiconductor substrate 121 is sealed by gasket 317. That is, the gasket 317 bonds cap 310 to the semiconductor substrate 121, defining a cavity there between. The gasket 317 may be fabricated directly onto one of the cap 310 and the substrate 110, or can be applied during a bonding process. For example, the gasket 317 may be formed of silicon, or some other material applied to at least one of the cap 310 and the substrate 110. A variety of materials may be used for bonding, including polymers (BCB, Polyimide, etc.) or different metals or metallic alloys (Au, Cu, Au—Hg alloy, etc.).

In an embodiment, a gas permeable screen or mesh (not shown) may cover the cap opening 310' and/or the substrate opening 110' in order to provide additional protection of the internal components, including the exposed upper and lower surfaces of the suspended portion 121a of the piezoelectric layer 121. For example, the screen or mesh may include multiple apertures sufficiently large to allow passage ambient environment gases to the suspended portion 121a, yet small enough to limit the amount of debris, contaminates and moisture that can enter the substrate and cap openings 110' and 310'.

The representative encapsulated resonator device further includes external contacts 335 and 337, which are connected to the lower and upper electrodes 122 and 124, respectively, through connectors 336 and 338. The contacts 335, 337 and corresponding connectors 336, 338 may be formed of a conductive material, such as gold, gold-tin alloy, or the like, and may electrically connect with circuitry (e.g., including trace patterns) and/or instrumentation, discussed below with reference to FIG. 4. In an embodiment, the contacts 335, 337 may be formed by applying a gold layer to the outer surfaces of the substrate 110 and the cap 310, respectively, and patterning the gold layer, for example, using photolithography, although various alternative techniques may be incorporated. The connectors 336, 338 are formed through corresponding via holes through the substrate 110 and the cap 310, respectively. In an embodiment, the vias may be formed prior to formation of the contacts 335, 337 by machining or by chemically etching the substrate 110 and/or the cap 310, for example, using photolithography, although various alternative techniques may be incorporated. It is understood that, in other embodiments, the number, location and arrangement of the contacts 335, 337 and connectors 336, 338 may vary to provide unique benefits for any particular situation or to meet application specific design requirements of various implementations, as would be apparent to one skilled in the art.

Figure 4:
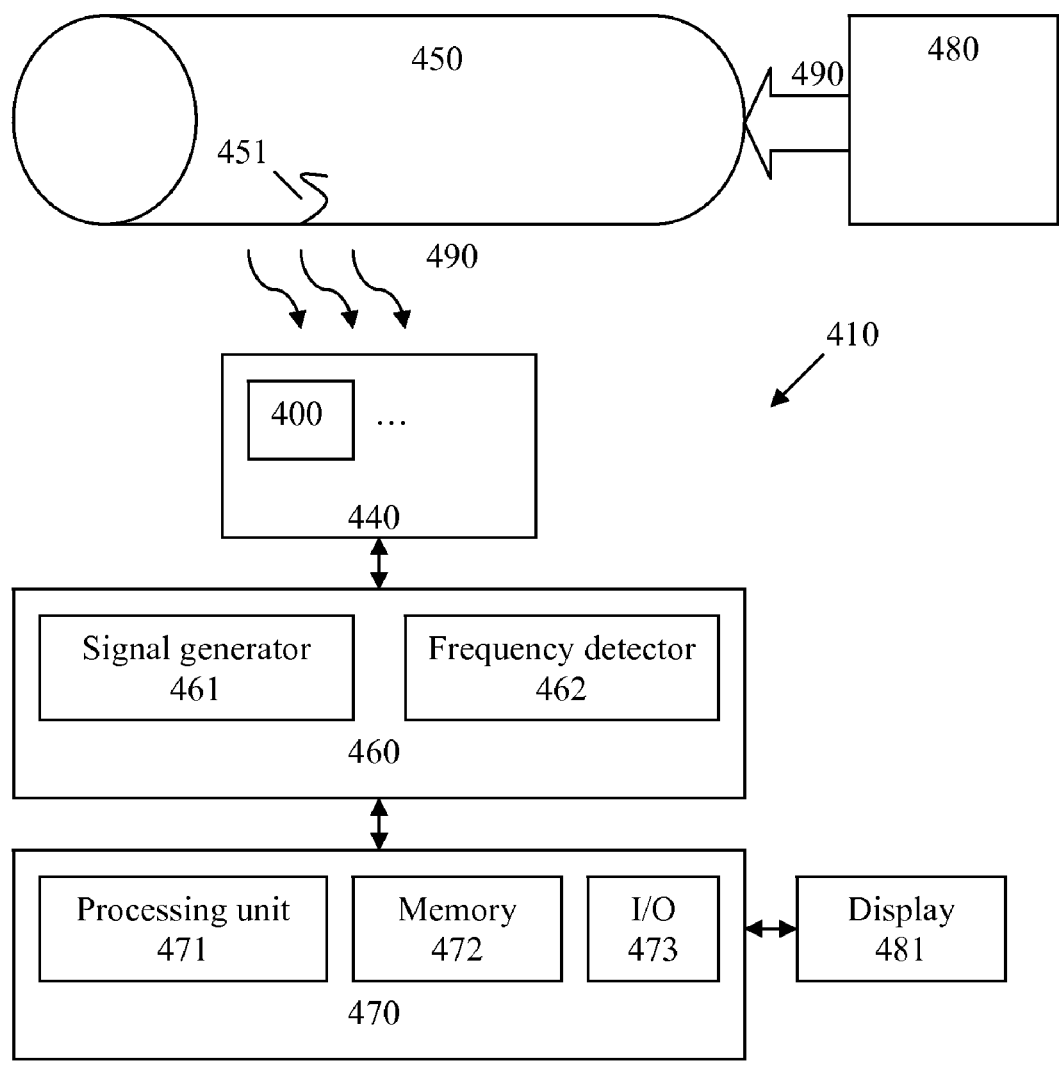
FIG. 4 is a block diagram illustrating a system for detecting helium using a resonator device, according to a representative embodiment.

FIG. 4 is a block diagram illustrating a system for detecting helium using a resonator device, according to a representative embodiment.

Referring to FIG. 4, the illustrative helium detecting system 410 includes resonator array 440, frequency detector 460, controller 470 and a power supply (not shown), such as a battery. In the example depicted in FIG. 4, helium gas (comprising helium atoms 490) is injected from helium gas source 480 into representative airtight vessel 450, which is to be tested for leaks. Helium gas is well suited for such leak detection due to its small mono-atomic molecular size, discussed above. In other words, if the structural integrity of the vessel 450 is sufficient to prevent leakage of helium atoms 490, then it logically follows that the structural integrity is likewise sufficient to prevent leakage of other gases, as well as liquids, having larger molecular sizes.

If the vessel 450 has a defect 451, such as a crack or a compromised seal or joint, the helium atoms 490 will leak through the defect 451, as shown. The resonator array 440 includes one or more resonator devices 400, which may be configured substantially the same as resonator device 100, discussed above with reference to FIGS. 1A-3. That is, each resonator device 400 includes an exposed piezoelectric thin film made of AlN, or other piezoelectric material having similar properties with respect to crystal lattice structure.

In various embodiments, the transducer array 440 may include a single resonator device 400, or multiple resonator devices 400 (not shown) arranged in a predetermined pattern. Multiple resonator devices 400 provide a larger detection area and/or more precise defect location. For example, the transducer array 440 may include rows and/or columns of addressable resonator devices 400, so that the location of any resonator device 400 detecting the presence of helium atoms 490 may be determined, thus indicating the portion of the vessel 450 containing the defect 451.

The system for detecting helium also includes frequency detector 460. In the depicted embodiment, the frequency detector 460 includes a signal generator 461, such as a voltage controlled oscillator (VCO) or a frequency synthesizer, for example, for providing an excitation input signal having an input frequency to the resonator device(s) 400. The frequency detector 460 also includes a frequency analyzer 462, such as a spectrum analyzer or oscilloscope, for example, for detecting the frequency of an output signal to determine whether the input signal has induced the resonant frequency of the corresponding resonator device 400. The frequency of the output signal is determined by the frequency response or function of the resonator device(s) 400.

In an embodiment, the signal generator 461 and the frequency analyzer 462 work in concert to determine the resonant frequency of the resonator device 400. For example, the signal generator 461 may perform a frequency sweep to identify the frequency of the input signal corresponding to the resonant frequency of the resonator device 400, e.g., as indicated by a peak in amplitude of the output signal detected and/or displayed on the frequency analyzer 462. This process may be repeated continuously or at various intervals in order to determine when the resonant frequency of the resonator device 400 changes, indicating the presence and absorption of helium atoms 490. Also, because of the frequency sweep, the signal generator 461 and frequency analyzer 462 are able to indicate the value of the initial resonant frequency, as well as the value of the shifted resonant frequency after absorption of the helium atoms 490.

Any other method of detecting a shift in resonant frequency of the one or more resonator devices 400 may be incorporated without departing from the scope of the present teachings. For example, in an embodiment, the signal generator 461 may simply provide an excitation input signal known to correspond to the initial resonant frequency of the resonator device 400, and the frequency analyzer 462 may simply be a device configured to monitor the peak of the corresponding output signal. Accordingly, a drop in amplitude of the output signal or otherwise loss of detection of the signal peak would indicate that the resonant frequency of the resonator device 400 has shifted (although the value of the new resonant frequency may not necessarily be known), indicating the presence and absorption of helium atoms 490. When the signal peak returns to normal, it is an indication that the helium atoms 490 have dissipated.

In another embodiment, the resonator device 400 may be implemented as an acoustic transducer, where the resonant frequency of the acoustic transducer is in an audible range. The signal generator 461 provides an excitation input signal known to correspond to the initial resonant frequency of the acoustic transducer, causing sound to be emitted at a pitch corresponding to the resonant frequency. The frequency analyzer 462 may be a device configured to monitor the sound. A change in pitch of the sound detected by the frequency analyzer 462 (or by a human operator of the detection system) would indicate that the resonant frequency of the acoustic transducer has shifted and that helium atoms 490 have been absorbed. When the sound emitted by the acoustic transducer returns to normal, it is an indication that the helium atoms 490 have dissipated.

In another embodiment, the frequency analyzer 462 may include an oscillator and a corresponding frequency detector in order to monitor the output frequency of the resonator device 400. The output frequency is simply compared to a known resonant frequency of the resonator device 400, e.g., by processor 471, discussed below, to determine whether the output frequency no longer correlates to the resonant frequency, indicating the presence and absorption of helium atoms 490.

Referring again to FIG. 4, the helium detecting system 410 may further include controller 470, which enables full or partial automated control of the transducer array 440, the helium gas source 480 and/or the frequency detector 460. The controller 470 may be configured to also enable storage and analysis of various data, such as times/dates and duration of helium detection, addresses of resonator devices 400 in the transducer array 440 detecting helium, amounts resonant frequency shifts, and the like. In the depicted embodiment, the controller 470 includes processing unit 471, memory 472 and interface 473, which may communicate with one another via a bus (not shown), for example.

The processing unit 471 may be constructed of any combination of hardware, firmware or software architectures, and include its own memory (e.g., nonvolatile memory) for storing executable software/firmware executable code that allows it to perform the various functions of the helium detecting system 410. Alternatively, the executable code may be stored in designated memory locations within memory 473. In various embodiments, the processing unit 471 may execute an operating system, such as Windows operating systems available from Microsoft Corporation, NetWare operating system available from Novell, Inc., or Unix operating system available from Sun Microsystems, Inc. The operating system controls execution of programs, as well as visual display 481 and/or user interface through interface 473.

The memory 472 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, tape, a diskette, a floppy disk, and the like. Further, the memory 472 may store statistical data, results of monitoring by the resonator device 400, address information and operating parameters of the resonator device 400, such as initial resonant frequency and corresponding excitation frequency, and summaries performed by the processing unit 471, for example. The memory 472 may also store additional information, such as previously detected changes in resonant frequency, temperature, operation time, and other parameters.

Helium detectors using resonator devices (e.g., 100, 400) are small and inexpensive, and consume low amounts of power. For example, the small size and low cost of MEMS resonators promote efficient implementation, such as permanent emplacement of helium detectors in spaces that are difficult to access or dimensionally constrained. Also, being based on semiconductor manufacturing process, the resonator devices described herein may be uniformly fabricated. As a result, the resonator devices may be used for helium detection without pre-calibration or use of expendable calibration media, for example.

The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A device for detecting helium in ambient atmosphere, the device comprising:

a resonator comprising a piezoelectric film layer configured to absorb helium atoms wherein the piezoelectric layer comprises a crystal lattice having interstitial spaces arranged substantially open to a planar surface of the piezoelectric film layer; and a frequency detector configured to detect a change in resonant frequency of the resonator when helium is absorbed into the piezoelectric film layer from the ambient atmosphere.

2. The device of claim 1, wherein the piezoelectric layer comprises aluminum nitride.

3. The device of claim 1, wherein the interstitial spaces capture at least one atom of the helium in the ambient atmosphere.

4. The device of claim 1, wherein a mass density of the piezoelectric layer increases when the at least one helium atom is captured in the interstitial spaces.

5. The device of claim 1, wherein the resonator further comprises first and second electrodes positioned on opposite surfaces of the piezoelectric film layer, the first and second electrodes receiving an electrical excitation signal causing mechanical vibration of the resonator.

6. The device of claim 5, wherein the first and second electrodes output an electrical output signal corresponding to the mechanical vibration, indicating whether the resonator is operating at the resonant frequency.

7. The device of claim 6, wherein the first electrode defines a first exposed portion on a first surface of the piezoelectric layer and the second electrode defines a second exposed portion on a second surface of the piezoelectric layer, the piezoelectric film layer absorbing the helium atoms through one of the first and second exposed portions.

8. The device of claim 7, wherein the first and second electrodes comprise annular shapes.

9. A device for detecting helium in ambient atmosphere, the device comprising:

a substrate;

a resonator formed on the substrate, the resonator comprising an aluminum nitride thin film layer between an upper electrode and a lower electrode, a first portion of the aluminum nitride thin film layer being exposed to the ambient atmosphere through a first opening defined by the upper electrode, wherein a crystal lattice structure of the aluminum nitride thin film layer is arranged to capture helium atoms from the ambient atmosphere that come into contact with the exposed first portion of the aluminum nitride thin film layer; and a frequency detector configured to detect a change in resonant frequency of the resonator when the helium atoms are captured in the crystal lattice structure of the aluminum nitride thin film layer.

10. The device of claim 9, further comprising:

a cap connected to the substrate to enclose at least a portion of the aluminum nitride thin film layer, the cap defining a cap opening above at least a portion of the first opening for exposing the first portion of the aluminum nitride thin film layer to the ambient atmosphere.

11. The device of claim 10, further comprising:

mesh covering the cap opening for protecting the exposed first portion of the aluminum nitride.

12. The device of claim 9, wherein the frequency detector detects the change in resonant frequency by identifying a shifted resonant frequency when the helium atoms are captured in the crystal lattice structure of the aluminum nitride thin film layer.

13. The device of claim 9, wherein the frequency detector detects the change in resonant frequency by identifying reduction in an amplitude peak at the resonant frequency when the helium atoms are captured in the crystal lattice structure of the aluminum nitride thin film layer.

14. The device of claim 9, wherein the frequency detector detects a second change in the resonant frequency when the helium atoms are released by the crystal lattice structure of the aluminum nitride thin film layer, indicating an absence of helium atoms.

15. The device of claim 9, further comprising:

a signal generator configured to provide an excitation input signal to one of the upper electrode and the lower electrode, initially causing vibration of the aluminum nitride thin film layer at the resonant frequency.

16. The device of claim 9, wherein a second portion of the aluminum nitride thin film layer is exposed to the ambient atmosphere through a second opening defined by the lower electrode.

17. The device of claim 16, wherein the substrate defines a substrate opening below at least a portion of the second opening for exposing the second portion of the aluminum nitride thin film layer to the ambient atmosphere through the substrate opening.

18. A system for detecting leaks from an object using helium, the system comprising:

a plurality of helium detecting devices according to claim 9, arranged in addressable positions in proximity to the object, wherein respective resonant frequencies of resonators of the helium detecting devices change when helium atoms are captured in crystal lattice structures of corresponding aluminum nitride thin film layers; and a processor configured to detect a change in the resonant frequency of at least one of the resonators and identifying a location of a leak of helium from the object based on the addressable position of the helium detecting device corresponding to the at least one of the resonators.

19. A system for detecting helium in ambient atmosphere, the system comprising:

array comprising plurality of resonators, each resonator comprising an aluminum nitride thin film layer between an upper electrode and a lower electrode, a first portion of the aluminum nitride thin film layer being exposed to the ambient atmosphere through a first opening defined by the upper electrode, wherein a crystal lattice structure of the aluminum nitride thin film layer is arranged to capture helium atoms from the ambient atmosphere that come into contact with the exposed first portion of the aluminum nitride thin film layer;

a frequency detector configured to detect a change in a resonant frequency of at least one resonator of the plurality of resonators when the helium atoms are captured in the crystal lattice structure of the corresponding aluminum nitride thin film layer of the at least one resonator; and a controller configured to determine a location of the helium atoms by identifying the at least one resonator having the change in the resonant frequency.

* * * * *